United States Patent
Hayashi et al.

(10) Patent No.: US 10,642,818 B2
(45) Date of Patent: May 5, 2020

(54) CAUSAL ANALYSIS DEVICE, CAUSAL ANALYSIS METHOD, AND NON-TRANSITORY COMPUTER READABLE STORAGE MEDIUM

(71) Applicants: Kabushiki Kaisha Toshiba, Minato-ku (JP); Toshiba Digital Solutions Corporation, Kawasaki-shi (JP)

(72) Inventors: Tetsuya Hayashi, Yokohama (JP); Shigeru Matsumoto, Nishitokyo (JP); Akihiro Sakurada, Nerima (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 172 days.

(21) Appl. No.: 15/771,429

(22) PCT Filed: Nov. 2, 2016

(86) PCT No.: PCT/JP2016/082601
§ 371 (c)(1),
(2) Date: Apr. 27, 2018

(87) PCT Pub. No.: WO2017/078067
PCT Pub. Date: May 11, 2017

(65) Prior Publication Data
US 2018/0267964 A1    Sep. 20, 2018

(30) Foreign Application Priority Data
Nov. 2, 2015    (JP) .................................. 2015-216175

(51) Int. Cl.
*G06F 16/95*    (2019.01)
*G06F 16/23*    (2019.01)
(Continued)

(52) U.S. Cl.
CPC ............ *G06F 16/23* (2019.01); *G06F 11/076* (2013.01); *G06F 16/26* (2019.01); *G06F 16/284* (2019.01); *G06F 16/95* (2019.01); *G06Q 10/04* (2013.01)

(58) Field of Classification Search
CPC ........ G06F 16/95; G06F 16/26; G06F 16/284; G06F 11/076; G06Q 10/04
(Continued)

(56) References Cited

U.S. PATENT DOCUMENTS 4,017,730 A * 4/1977 Barrett ..................... G01T 1/295
250/363.06
5,778,345 A * 7/1998 McCartney ............ G06Q 10/06
705/2

(Continued)

FOREIGN PATENT DOCUMENTS

JP         2015-49790 A      3/2015

OTHER PUBLICATIONS

International Search Report dated Jan. 17, 2017 in PCT/JP2016/082601 filed Nov. 2, 2016.

*Primary Examiner* — Dung K Chau
(74) *Attorney, Agent, or Firm* — Oblon, McClelland, Maier & Neustadt, L.L.P.

(57) ABSTRACT

A causal analysis device according to an embodiment includes an extractor, a counter, a calculator, and a generator. The extractor performs extraction from combination data in which an incident and one or a plurality of factors causing the incident are associated with each other in accordance with occurrence of combination data. The counter counts the number of occurrences of the incident or the number of occurrences of a combination of the plurality of factors on the basis of a combination of the incident and the factors included in the extracted combination data. The calculator calculates an index value that corresponds to the combina- (Continued)

tion of the incident and the factors and changes in accordance with the number of occurrences of the combination of the incident and the factors on the basis of a result of the counting of the counter. The generator generates an image in which an image indicating the index value calculated by the calculator for each combination of the incident and the factors is associated with the combination of the incident and the factors.

14 Claims, 17 Drawing Sheets

(51) Int. Cl.
*G06F 16/28* (2019.01)
*G06Q 10/04* (2012.01)
*G06F 16/26* (2019.01)
*G06F 11/07* (2006.01)

(58) Field of Classification Search
USPC .......................................................... 707/727
See application file for complete search history.

(56) References Cited

U.S. PATENT DOCUMENTS

| | | | |
|---|---|---|---|
| 2003/0059110 A1* | 3/2003 | Wilt | G06T 5/40 382/168 |
| 2014/0096146 A1* | 4/2014 | Maor | G06F 11/3419 719/318 |
| 2014/0172371 A1 | 6/2014 | Zhu et al. | |
| 2016/0103891 A1* | 4/2016 | Choudhary | G06F 16/24565 707/722 |

\* cited by examiner

FIG. 2A

FIG. 2B

| FACTOR xa | TIME | EVENT INFORMATION |
|---|---|---|
| FACTOR xa1 | | START OF PRODUCTION OF PRODUCT A |
| FACTOR xa2 | | SUPPLEMENTATION OF MATERIALS |
| FACTOR xa3 | | START OF PRODUCTION OF PRODUCT B |
| ... | | |
| | | |

FIG. 2C

| FACTOR xb | TIME | EVENT INFORMATION |
|---|---|---|
| FACTOR xb1 | | REPLACEMENT OF NOZZLES |
| FACTOR xb2 | | CHANGE OF CONTROL INSTRUCTION VALUES |
| FACTOR xb3 | | |
| ... | | |
| | | |

FIG. 2D

| FACTOR xc | TIME | EVENT INFORMATION |
|---|---|---|
| FACTOR xc1 | | ABNORMALITY OF DETECTED VALUES |
| FACTOR xc2 | | REPLACEMENT OF SENSORS |
| FACTOR xc3 | | |
| ... | | |
| | | |

FIG. 2E

| FACTOR xd | TIME | EVENT INFORMATION |
|---|---|---|
| FACTOR xd1 | | WARNING OF TEMPERATURE MEASUREMENT VALUES |
| FACTOR xd2 | | CHANGE OF PROCESSING SPEED |
| FACTOR xd3 | | |
| ... | | |
| | | |

FIG. 2F

| INCIDENT y | TIME | EVENT INFORMATION |
|---|---|---|
| INCIDENT ya | | ABNORMALITY OF INSPECTION VALUE OF PRODUCT |
| INCIDENT yb | | ABNORMALITY OF DISTRIBUTION OF INSPECTION VALUES |
| INCIDENT yc | | |
| ... | | |
| | | |

| SET ID | COMBINATION OF FACTORS AND INCIDENT |
|---|---|
| | FACTOR x2   FACTOR x4   INCIDENT y1 |
| | FACTOR x3   FACTOR x4   INCIDENT y1 |
| | FACTOR x1   FACTOR x4   INCIDENT y1 |
| | FACTOR x1   FACTOR x2   INCIDENT y1 |
| | FACTOR x1   FACTOR x3   INCIDENT y1 |
| | FACTOR x4                INCIDENT y2 |
| | FACTOR x1   FACTOR x5   INCIDENT y3 |
| | ... |

| SET ID | COMBINATION OF FACTORS AND INCIDENT |
|---|---|
| | FACTOR x2   FACTOR x4   INCIDENT y1 |
| | FACTOR x3   FACTOR x4   INCIDENT y1 |
| | FACTOR x1   FACTOR x4   INCIDENT y1 |
| | ... |
| | |

| COMBINATION ID | NUMBER OF OCCURRENCES OF COMBINATION OF FACTORS AND INCIDENT |
|---|---|
| | |
| | |
| | |
| | |
| | |

| COMBINATION ID | RELIABILITY OF COMBINATION PATTERN OF FACTORS AND INCIDENT |
|---|---|
| | |
| | |
| | |
| | |
| | |

250 (260)

|   |           | Y |  |  |  |
|---|-----------|------------|------------|------------|------------|
|   |           | INCIDENT ya | INCIDENT yb | INCIDENT yc | INCIDENT yd |
| x | FACTOR xa |  |  |  |  |
|   | FACTOR xb |  |  |  |  |
|   | FACTOR xc |  |  |  |  |
|   | FACTOR xd |  |  |  |  |

|   |           | Y |  |  |  |
|---|-----------|------------|------------|------------|------------|
|   |           | INCIDENT ya | INCIDENT yb | INCIDENT yc | INCIDENT yd |
| x | FACTOR xa | --- | --- | --- | --- |
|   | FACTOR xb | 300 | 600 | 10 | 5 |
|   | FACTOR xc | 700 | 0 | 200 | 1300 |
|   | FACTOR xd | 800 | 450 | 1200 | 800 |

FIG. 20

| SET ID | COMBINATION OF FACTORS |
|---|---|
| | FACTOR x2   FACTOR x4 |
| | FACTOR x3   FACTOR x4 |
| | FACTOR x1   FACTOR x4 |
| | FACTOR x1   FACTOR x2 |
| | FACTOR x1   FACTOR x3 |
| | FACTOR x4 |
| | FACTOR x1   FACTOR x5 |
| | ... |

| COMBINATION ID | NUMBER OF OCCURRENCES OF COMBINATION OF FACTORS |
|---|---|
| | |
| | |
| | |
| | |
| | |

CAUSAL ANALYSIS DEVICE, CAUSAL ANALYSIS METHOD, AND NON-TRANSITORY COMPUTER READABLE STORAGE MEDIUM

TECHNICAL FIELD

Embodiments described herein relate generally to a causal analysis device, a causal analysis method, and a non-transitory computer readable storage medium.

BACKGROUND ART

A causal analysis device that analyzes a causal relation between an incident and causal factors which cause the incident is known in the related art. However, according to the related-art technology, if there are many factors causing an incident, it is sometimes not possible to accurately analyze the relationship between the causal factors and the incident.

CITATION LIST

Patent Literature

[Patent Literature 1]
Japanese Unexamined Patent Application, First Publication No. 2015-49790

SUMMARY OF INVENTION

Technical Problem

An object to be achieved by the present invention is to provide a causal analysis device, a causal analysis method, and a non-transitory computer readable storage medium which can more accurately analyze the cause of an incident which is caused by a plurality of factors in combination.

Solution to Problem

A causal analysis device according to an embodiment includes an extractor, a counter, a calculator, and a generator. The extractor is configured to perform extraction from combination data in which an incident and one or a plurality of factors causing the incident are associated with each other in accordance with occurrence of combination data. The counter is configured to count the number of occurrences of the incident or the number of occurrences of a combination of the plurality of factors on the basis of a combination of the incident and the factors included in the combination data. The calculator is configured to calculate an index value that corresponds to the combination of the incident and the factors and changes in accordance with the number of occurrences of the combination of the incident and the factors on the basis of a result of the counting of the counter. The generator is configured to generate an image in which an image indicating the index value calculated by the calculator for each combination of the incident and the factors is associated with the combination of the incident and the factors.

BRIEF DESCRIPTION OF DRAWINGS

FIG. 2A is a diagram illustrating factors occurring in a production line including a plurality of processes in the embodiment.

FIG. 2B is a diagram illustrating factors occurring in a production line including a plurality of processes in the embodiment.

FIG. 2C is a diagram illustrating factors occurring in a production line including a plurality of processes in the embodiment.

FIG. 2D is a diagram illustrating factors occurring in a production line including a plurality of processes in the embodiment.

FIG. 2E is a diagram illustrating factors occurring in a production line including a plurality of processes in the embodiment.

FIG. 2F is a diagram illustrating factors occurring in a production line including a plurality of processes in the embodiment.

FIG. 4 is a diagram showing an example of collection data stored in a collection data storage unit 210 according to the embodiment.

FIG. 5 is a diagram showing an example of extraction data 241 in the embodiment.

FIG. 6 is a diagram showing an example of count data 242 in the embodiment.

FIG. 7 is a diagram showing an example of reliability data 243 in the embodiment.

FIG. 20 is a view showing an example of collection data stored in a collection data storage unit 210A in the embodiment.

FIG. 21 is a diagram showing an example of count data 242A in the embodiment.

DESCRIPTION OF EMBODIMENTS

Hereinafter, a causal analysis device, a causal analysis method, and a non-transitory computer readable storage medium according to embodiments will be described with reference to the drawings.

First Embodiment

Figure 1:
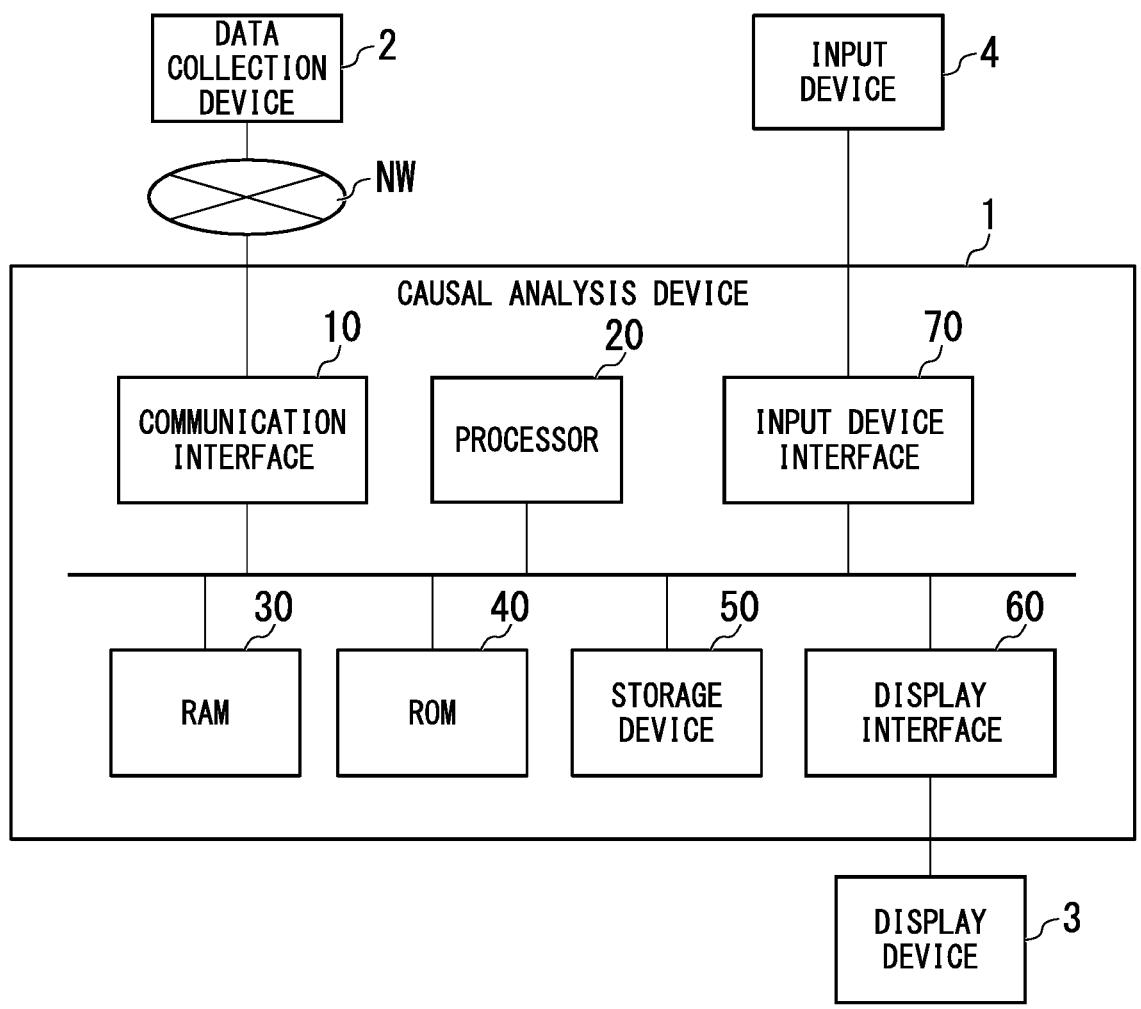
FIG. 1 is a diagram showing an example of a configuration of a causal analysis device 1 according to a first embodiment.

The causal analysis device 1 is a device that outputs information indicating the relationship between a cause (factor) and a result (incident) using various types of data for analyzing the relationship as an analysis target. FIG. 1 is a diagram showing an example of a configuration of the causal analysis device 1 according to an embodiment. The causal analysis device 1 according to the present embodiment includes a communication interface 10, a processor 20 such as a central processing unit (CPU), a random access memory (RAM) 30, a read only memory (ROM) 40, a storage device 50, a display interface 60, and an input device interface 70. These elements are communicably connected to each other via a bus or the like in the causal analysis device 1.

The communication interface 10 performs communication with other devices via a network NW. The network NW includes a local area network (LAN), a wide area network (WAN), or the like. The communication interface 10 receives collection data collected by the data collection device 2 from the data collection device 2. The collection data is data (combination data) in which causes (factors) and results (incidents) are associated with each other one to one or one to two or more.

The data collection device 2 collects information of various incidents occurring in processes in a production line and provides the collected information of the various incidents to the causal analysis device 1 as collection data in some cases. An example of this will be described below, but the present invention is not limited thereto.

FIG. 2A to FIG. 2F are diagrams illustrating factors occurring in a production line including a plurality of processes. As shown in FIG. 2A, the production line has process A, process B, process C, and process D of different types, which are performed in the order shown. In each of the processes, factors x which can be causes of each incident y are detected and a history thereof is managed. For example, as shown in FIG. 2B, the occurrence of factor xa1, factor xa2, factor xa3, . . . in process A is recorded as a log, and information such as the time at which each factor occurred and the content (event content) of the factor is managed as data. Each factor occurring in the process A is described as factor xa as a representative.

As shown in FIG. 2C, factors xb1, xb2, xb3, . . . occur in process B. As shown in FIG. 2D, factors xc1, xc2, xc3, . . . occur in process C. As shown in FIG. 2E, factors xd1, xd2, xd3, . . . occur in process D. The occurrence of factors in each process is recorded as a log, and information such as the time at which each factor occurred and the content (event content) of the factor is managed as data. Factors occurring in process A, process B, and process C are described as factor xa, factor xb, and factor xc as representatives.

Further, as shown in FIG. 2F, incidents y occur in the production line and the occurrence of incident ya, incident yb, incident yc, is recorded as a log. Information such as the time at which each incident occurred and the content (event content) of the incident is managed as data. Each incident that occurs is described as incident y as a representative.

In the following description, factors xa, xb, xc, and xd will be described by way of example for simplicity of explanation. It is assumed that each of the above factors x occurs independently.

Factors of a plurality of processes may be a related cause of an incident y or a factor of a specific process may be a cause thereof. For example, when four factors xa, xb, xc, and xd are included among factors x that have occurred, sets of factors x that can be causes are listed as follows.

{xa}, {xb}, {xc}, {xd}, {xa, xb}, {xa, xc}, {xa, xd}, {xb, xc}, {xb, xd}, {xc, xd}, {xa, xb, xc}, {xa, xb, xd}, {xa, xc, xd}, {xa, xb, xc, xd}

The above is an example, and the number of factors x, the suitability of combinations of factors x, the number of sets of factors x, or the like are not limited to those of the above example.

The data collection device 2 associates each set of factors x and an incident y relating to the set of factors x with each other and combines the set of factors x and the incident y which are associated with each other to form combination data. The data collection device 2 provides the combination data to the causal analysis device 1.

It is to be noted that the data collection device 2 may collect the collection data as only data of factors x and only data of incidents y separately. In this case, the causal analysis device 1 may generate the combination data according to the time at which the data is acquired, situations in which the factors x and the incidents y occurred, or the like.

Description will now return to the description of the causal analysis device 1. The processor 20 develops and executes the program stored in the ROM 40 or the storage device 50 in the RAM 30 as necessary.

The RAM 30 temporarily stores the results of processing performed by the processor 20 or the like. The ROM 40 stores a boot program executed by the processor 20 or the like. The storage device 50 is a hard disk drive (HDD) or a flash memory such as a solid state drive (SSD) or an SD memory card (registered trademark).

A display device 3 is connected to the display interface 60. The display interface 60 provides image information generated by the processor 20 to the display device 3. The display device 3 is a liquid crystal display (LCD), an organic electroluminescence (EL) display device, or the like. The display device 3 displays an image based on the image information provided via the display interface 60.

An input device 4 is connected to the input device interface 70. The input device 4 includes a pointing device such as a mouse, a keyboard, or the like. The input device 4 may also include a drive device to which a portable storage device is attached.

Figure 3:
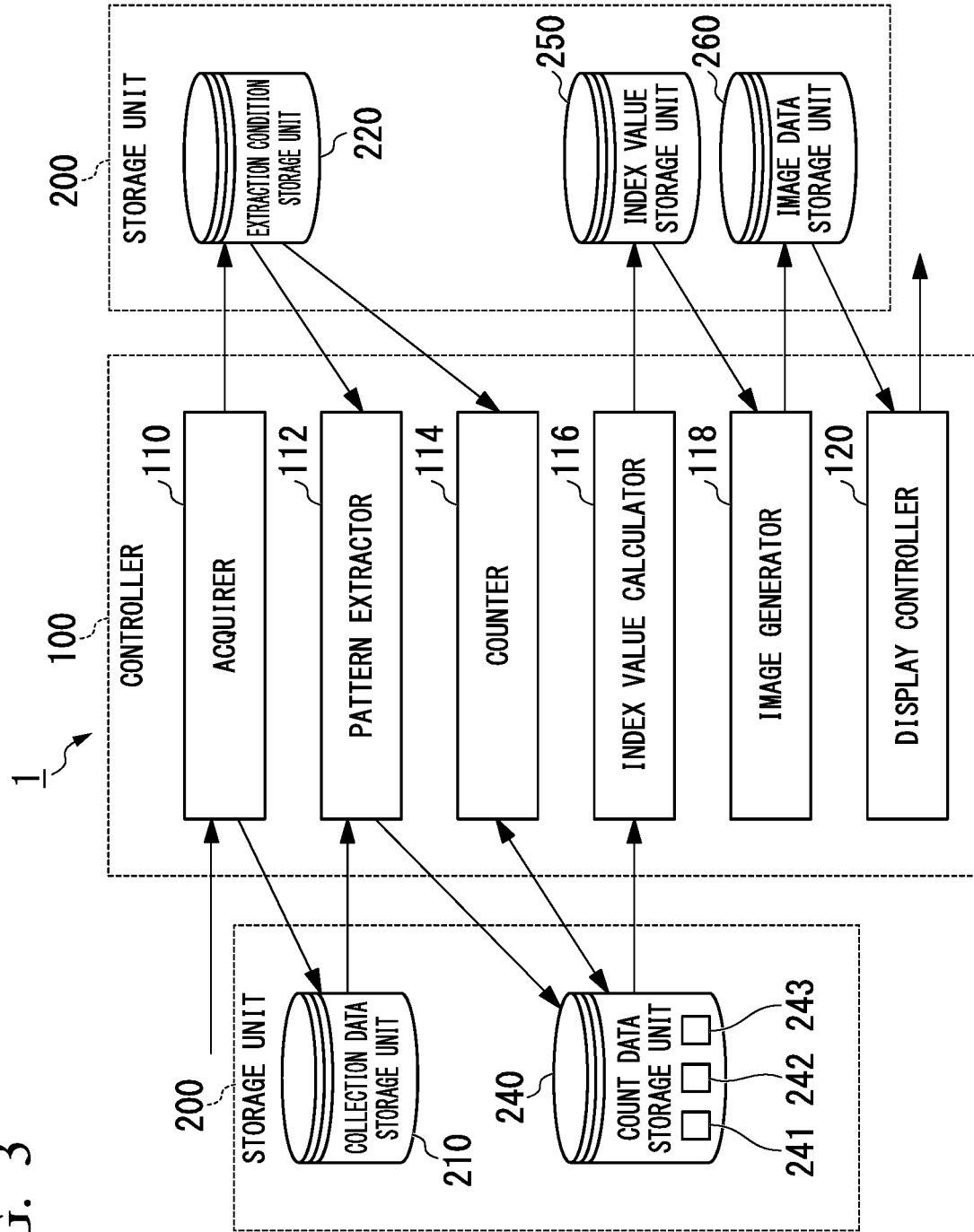
FIG. 3 is a diagram showing an example of a functional configuration of the causal analysis device 1 according to the embodiment.

FIG. 3 is a diagram showing an example of a functional configuration of the causal analysis device 1 according to the embodiment. The causal analysis device 1 includes a controller 100 and a storage unit 200.

The storage unit 200 is realized by any one of the RAM 30, the ROM 40, or the storage device 50. The storage unit 200 includes a collection data storage unit 210, an extraction condition storage unit 220, a count data storage unit 240, an index value storage unit 250, and an image data storage unit 260.

The controller 100 includes an acquirer 110, a pattern extractor 112, a counter 114, an index value calculator 116, an image generator 118, and a display controller 120. Each of these functional units included in the controller 100 is realized by the processor 20 executing a program. It is to be noted that some or all of the functional units of the controller 100 may be hardware functional units such as a large scale integration (LSI), an application specific integrated circuit (ASIC), or a field-programmable gate array (FPGA).

The acquirer 110 acquires collection data collected by the data collection device 2 via the communication interface 10. The acquirer 110 writes the collection data acquired from the data collection device 2 to the collection data storage unit 210.

FIG. 4 is a diagram showing an example of collection data stored in the collection data storage unit 210. The collection data is information in which information items indicating combinations of factors and an incident are associated with set IDs identifying the information items.

The acquirer 110 acquires extraction condition information or the like specifying a condition for extracting data from the collection data from the input device 4 via the input device interface 70 and writes the acquired extraction condition information to the extraction condition storage unit 220.

The pattern extractor 112 reads collection data (combination data) stored in the collection data storage unit 210 and extracts combination data that satisfies a predetermined extraction condition on the basis of the extraction condition information stored in the extraction condition storage unit 220. The pattern extractor 112 writes the extracted data as extraction data 241 to the count data storage unit 240.

For example, the pattern extractor 112 extracts combination data items other than those including incidents y that have occurred few times from the collection data. Hereinafter, the extracted data is referred to as extraction data. It is to be noted that the pattern extractor 112 may rearrange the extracted combination data items such that specific factors or incidents or specific combinations of factors and an incident are grouped or may rearrange the extracted combination data items in order of the number of factors included in the combination data items.

FIG. 5 is a diagram showing an example of the extraction data 241. The extraction data 241 is information in which information items indicating combinations of factors and an incident are associated with set IDs identifying the information items. The set IDs correspond to the set IDs in the collection data shown in FIG. 4.

The counter (or aggregator) 114 reads the extraction data 241 stored in the count data storage unit 240 and performs a counting (or aggregating) process for each combination data item included in the extraction data. The counter 114 writes the counting result as count data 242 to the count data storage unit 240. Further, the counter 114 calculates the reliability on the basis of the extraction data and writes the calculated reliability to the count data storage unit 240 as reliability data 243.

FIG. 6 is a diagram showing an example of the count data 242. The count data 242 is information in which information items indicating the numbers of occurrences of combinations of factors and an incident are associated with combination IDs identifying the types of the combinations. The results of counting that the counter 114 has performed on the combination data included in the extraction data 241 are written as the number of occurrences of a combination of factors and an incident.

FIG. 7 is a diagram showing an example of the reliability data 243. The reliability data 243 is data in which the reliabilities of combination patterns of factors and incidents are associated with combination IDs. For example, the reliability may be, but is not limited to, a ratio ($\alpha/\beta$) between the total number ($\alpha$) of occurrences of combination data in the extraction data 241 and the number ($\beta$) of data items, each including all factors included in the combination data, which is counted without considering the incident. Alternatively, the reliability may be determined, for example, from a ratio ($\alpha/\beta$) between the number ($\alpha$) of combination data items corresponding to a common incident among the combination data included in the acquired data that is to be extracted and the total number ($\beta$) of combination data items included in the acquired data. By determining the reliability in this way, it is possible to quantify how much data including a matching set of factors and an incident has occurred among an entire data set including a matching set of factors only. The pattern extractor 112 may determine the ratio ($\alpha/\beta$) calculated as described above as the reliability and thus may extract combination data which is to be counted by the counter 114 on the basis of the reliability.

Figure 8:
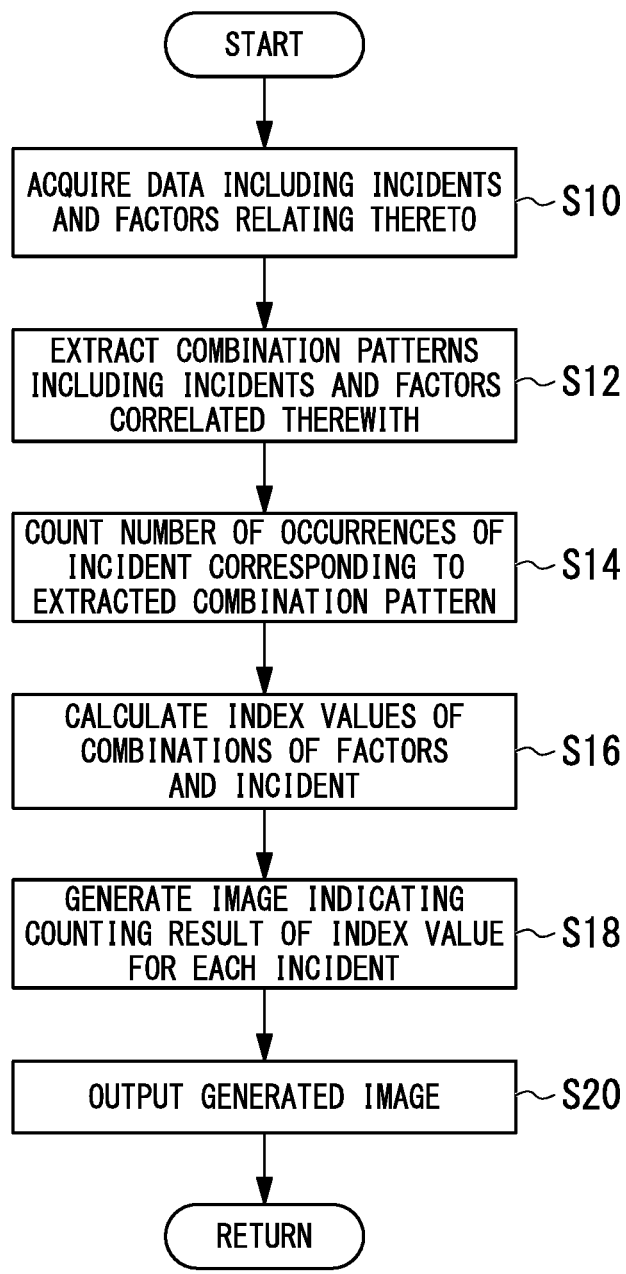
FIG. 8 is a flowchart showing an example of processing of the causal analysis device 1 according to the embodiment.

FIG. 8 is a flowchart showing an example of processing of the causal analysis device 1 in the embodiment. First, the acquirer 110 collects collection data via the communication interface 10 and writes the collection data to the collection data storage unit 210 (S10).

Next, the pattern extractor 112 reads the collection data stored in the collection data storage unit 210 in S10 and extracts combination data that satisfies a predetermined extraction condition based on extraction condition information stored in the extraction condition storage unit 220 (S12). The pattern extractor 112 writes the extracted combination data as extraction data 241 to the count data storage unit 240. A specific method of the pattern extractor 112 narrowing down the combination data that is to be analyzed will be described later.

Next, the counter 114 counts the numbers of occurrences n(y) of incidents y corresponding to the combination data on the basis of the combination data extracted by the pattern extractor 112 in S12 (S14). The counter 114 writes the counting result to the count data storage unit 240 as the count data 242 in association with combination IDs.

The index value calculator 116 refers to the count data 242 stored in the count data storage unit 240 using the combination IDs and calculates index values of combinations of incidents y and factors x (S16). Thereafter, the index value calculator 116 writes the calculated index values to the index value storage unit 250. Details of the process of calculating the index values will be described later.

The image generator 118 generates image data on the basis of the index values stored in the index value storage unit 250 (S18). The image generator 118 generates an image from which it is easy to visually identify the characteristics of the count data 242 and writes image data of the image to the image data storage unit 260.

The display controller 120 provides the image data such that an image based on the image data stored in the image data storage unit 260 is displayed on the display device 3 (S20).

Figure 9:
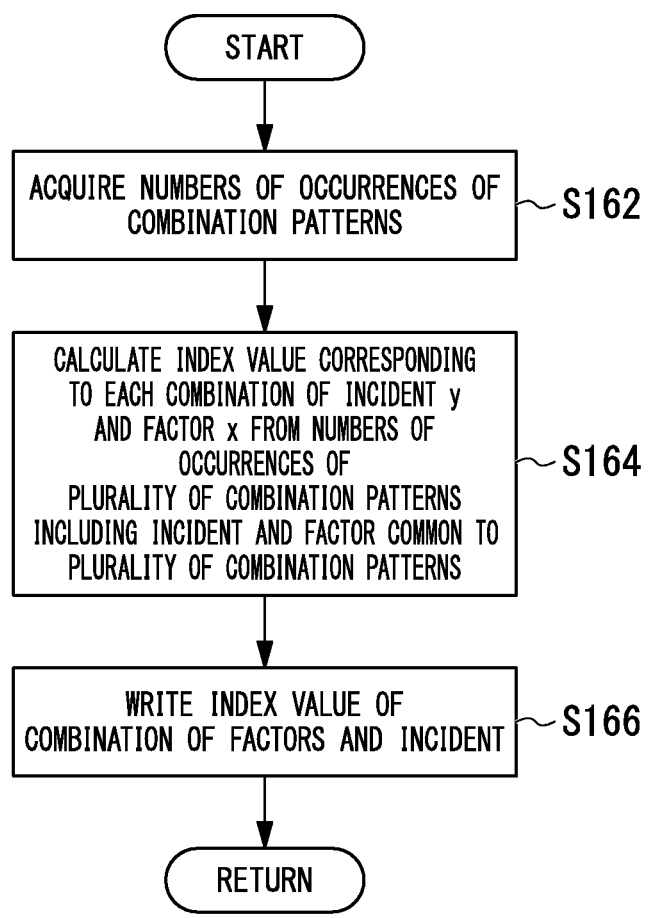
FIG. 9 is a flowchart showing an example of a process (S16) of calculating an index value in the embodiment.

FIG. 9 is a flowchart showing an example of an index value calculation process in the embodiment. First, the index value calculator 116 acquires the numbers of occurrences of all combination data items (or combination data items within a target range) included in the count data 242 (S162). Next, the index value calculator 116 calculates an index value corresponding to each combination of an incident y and a factor(s) x from the numbers of occurrences, obtained in S162, of a plurality of combination data items including the incident and factor(s) common to the plurality of combination data items (S164). Next, the index value calculator 116 writes the index value calculated in the second step to the index value storage unit 250 (S166). The index value calculated as described above changes in accordance with the number of occurrences of the combination data.

It is to be noted that the index value calculator 116 may limit data that is to be set as an analysis target when calculating the index value in advance according to a predetermined condition.

Figure 10:
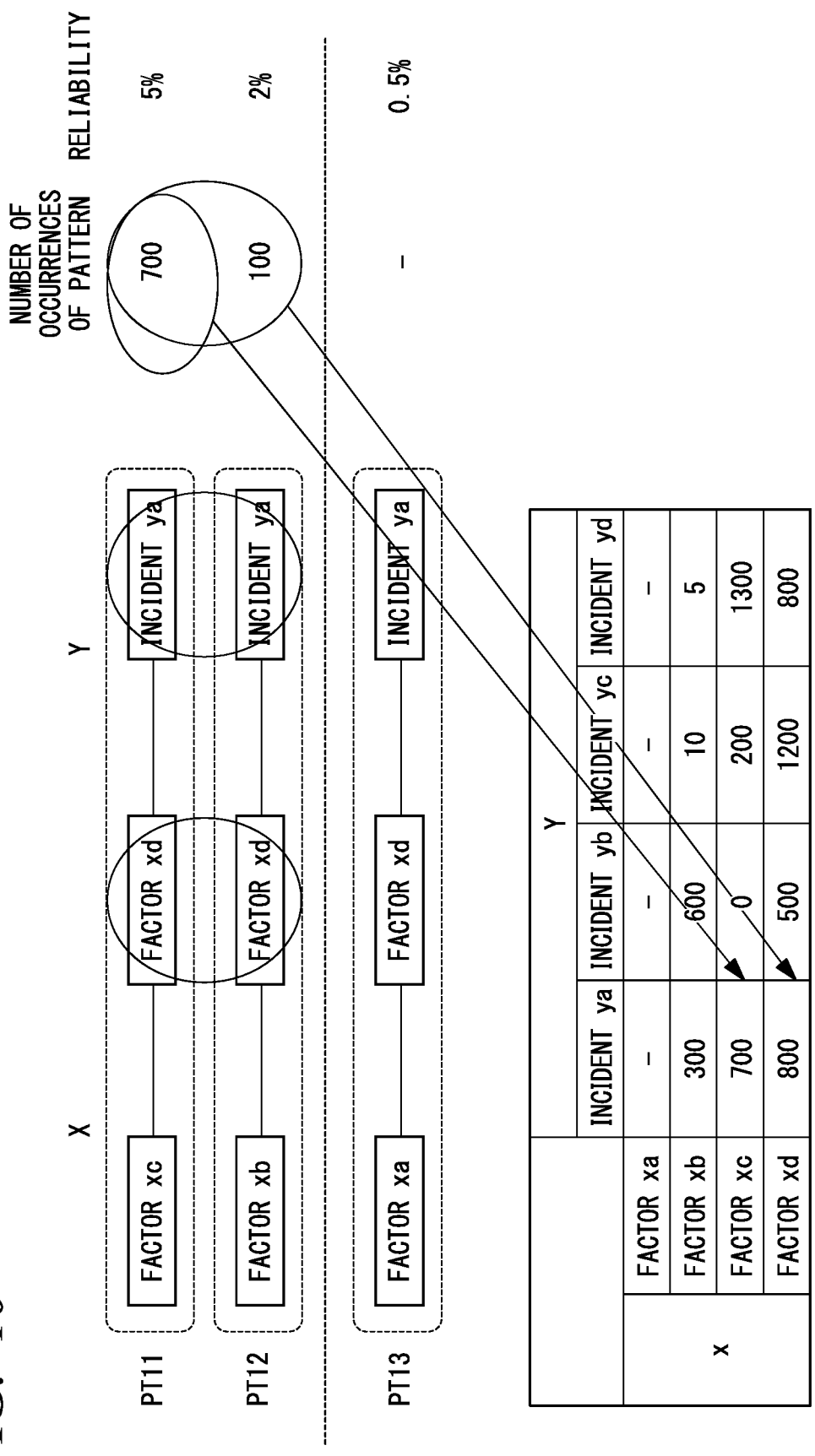
FIG. 10 is a diagram showing a result of processing performed on combination data extracted as certain extraction data 241.

FIG. 10 is a diagram showing a result of processing performed on combination data extracted as certain extraction data 241. In the example of FIG. 10, the extraction data 241 includes combination data PT11, combination data PT12, and combination data PT13. The combination data PT11 is a pattern in which both a factor xc and a factor xd have individually occurred and an incident ya has occurred as a result. The combination data PT12 is a pattern in which both a factor xb and the factor xd have individually occurred and the incident ya has occurred as a result. The combination data PT13 is a pattern in which both a factor xa and the factor xd have individually occurred and the incident ya has occurred as a result. The index value calculator 116 selects combination data whose reliability is equal to or greater than a predetermined value as an analysis target. For example, when selecting combination data whose reliability is equal to or greater than 1% as an analysis target, the index value calculator 116 excludes the combination data PT13 whose reliability is less than 1% from the analysis target. It is to be noted that setting of the predetermined value used to determine the reliability is arbitrary without being limited to the above. By selecting combination data using the reliability in this way, it is possible to select highly correlated combination data which cannot be selected only by the coefficients of the numbers of occurrences of factor x and incident y.

In the example of FIG. 10, it is shown that the counter 114 counts the number of occurrences n(PT11) of the combination data PT11, the counting result is 700, and the reliability is 5%. As described above, the reliability is a ratio between the number of occurrences n(PT11) of the combination data PT11 among the extraction data 241 (which is the numerator of the ratio) and the total number of data in which the factor xc and the factor xd have occurred (which is the denominator of the ratio). It is also shown that the number of occurrences n(PT12) of the combination data PT12 is 100 and the reliability is 2%.

The index value calculator 116 according to the present embodiment calculates an index value of each combination of factor(s) xi and an incident yj on the basis of the number of occurrences of the pattern of each combination data item. This will be described below.

In the present embodiment, the index value is a value obtained by counting the number of combination data items including a factor(s) and an incident in the counting result data in association with a combination of the factor(s) and the incident.

For example, the combination data PT11 and the combination data PT12 include the common incident ya and the common factor xd. In this case, the index value calculator 116 sums the numbers of occurrences of the patterns PT11 and PT12 which include the factor xd and the incident ya and determines that an index value corresponding to the factor xd and the incident ya is 800. Also, for example, a combination of the factor xc and the incident ya is included only in the combination data PT11. In this case, the index value calculator 116 determines that an index value corresponding to the factor xc and the incident ya is 700. It is to be noted that FIG. 10 shows an example and the present invention is not limited to the example.

Figures 11, 12:
FIG. 11 is a diagram showing an example of an index value storage unit 250 that stores the calculated index value in the embodiment.
FIG. 12 is a diagram illustrating an example of an image generated by an image generator 118 in the embodiment.

FIG. 11 is a diagram showing an example of the index value storage unit 250 that stores the calculated index value.

The index value storage unit 250 is, for example, a storage region which has factor x and incident y as labels of two-dimensional data and in which index values are stored in entries corresponding to the labels.

The image generator 118 reads the index values stored in the index value storage unit 250 and generates image data. The image generator 118 generates an image from which it is easy to visually identify the characteristics of the count data 242 and writes image data of the image to the image data storage unit 260. The above image includes various graphs, various radar charts, various heat maps, or the like created from the above index values which are numeric data.

FIG. 12 is a diagram illustrating an example of the image generated by the image generator 118. In the example of FIG. 12, it is assumed that a heat map is displayed. The image generator 118 converts the values of items corresponding to combinations of a factor x and an incident y in the image data storage unit 260 into image data indicating brightness or color according to the values.

As shown in FIG. 12, the image generator 118 adds image information which is a heat map based on the index values to a cross table including factors x and incidents y as data labels and generates the image shown in FIG. 12. The image shown in FIG. 12 is generated, for example, such that the values of entries are determined using threshold values 500 and 1000 and the brightness of the image of each entry of the cross table is in 3 gradations. The number of the threshold values and the values are arbitrary and the present invention is not limited thereto.

The image shown in FIG. 12 is generated, for example, such that the image is darker as the index value is greater and is brighter as the index value is smaller. The image shown in FIG. 12 may also be generated such that the color of the image is closer to red (or blue) as the index value is greater and closer to blue (or red) as the index value is smaller. Further, the image generator 118 may determine the value of each entry using a plurality of threshold values and generate an image to be displayed in gradation. The image generator 118 may select threshold values which reduce variations in the results of division by gradation.

The display controller 120 reads image data stored in the image data storage unit 260 and provides the image data through the display interface 60 such that the display device 3 displays an image based on the image data. The display device 3 displays the image provided via the display interface 60.

According to the causal analysis device 1 of the above embodiment, extraction is performed from combination data in which an incident and one or a plurality of factors causing the incident are associated with each other in accordance with occurrence of the combination data and the number of occurrences of the incident is counted on the basis of combinations of an incident and factors included in the combination data. On the basis of the counting result, the causal analysis device 1A calculates an index value that corresponds to a combination of an incident and a factor(s) and changes in accordance with the number of occurrences of the combination of the incident and the factor(s). This makes it possible to more precisely analyze the cause of an incident which is caused by a plurality of factors in combination.

Further, the causal analysis device 1 counts the number of occurrences of each pattern, creates a cross table of the counting results and factors, and displays the created cross table as a heat map. This makes it possible to identify which factor x is the main factor of an incident y at a glance.

Here, comparison with comparative technologies will be described. For example, there is a technology in which the numbers of various factors occurring in time series which lead to each result are visualized. In this case, in a method of visualizing the simple number of occurrences, when many factors uncorrelated with a result have occurred, display of the factors uncorrelated with the result is emphasized. In particular, when a factor that does not relate to an incident y normally occurs frequently, the factor should not be emphasized and displayed originally. In such a technology, factors that should be emphasized and displayed originally are buried among factors (noise) that should not be emphasized and displayed originally.

Further, there is a technique in which correlation between incidents and factors is analyzed in advance and factors that are not correlated with each incident are excluded. In this case, a factor that does not lead to an incident by itself but leads to the incident for the first time in combination with a plurality of factors is excluded. Also, as the number of results and factors increases, enormous combination data is extracted. Therefore, when results are simply listed and displayed, it is sometimes difficult to easily read the results.

On the other hand, the causal analysis device 1 of the embodiment can solve the problems of the comparative examples. That is, it is possible to more precisely analyze the cause of an incident which is caused by a plurality of factors in combination. Furthermore, the causal analysis device 1 of the embodiment visualizes data in the simple form of a heat map of factors and results, not a list of combination data of factors. Therefore, it is possible to identify which factor contributes most to each result at a glance.

(Regarding Pattern Extraction)

For the purpose of reducing processing load or the like, the causal analysis device 1 may exclude a part of the collection data from the analysis target and perform a desired analysis process. For example, the pattern extractor 112 performs a pattern extraction process with reference to one or more types of extraction condition information set according to the purpose. Thus, desired combination data becomes a target of the causal analysis process and combination data that affects the execution of the causal analysis process is deleted from the target of the causal analysis process. As each functional unit of the controller 100 adjusts the target of the causal analysis process as described above, the causal analysis device 1 can perform a desired analysis process.

For example, the causal analysis device 1 may preset combination data to be analyzed as extraction condition information and thus perform extraction of combination data included in the collection data. Thereby, the causal analysis device 1 can easily extract desired combination data even from collection data including combination data in which a plurality of factors and incidents are combined. In addition, the causal analysis device 1 can more precisely analyze the cause of an incident which is caused by a plurality of factors in combination.

Second Embodiment

A second embodiment will now be described. The second embodiment is different from the first embodiment in the method of the index value calculator 116 calculating index values. This difference will be mainly described below.

Figure 13:
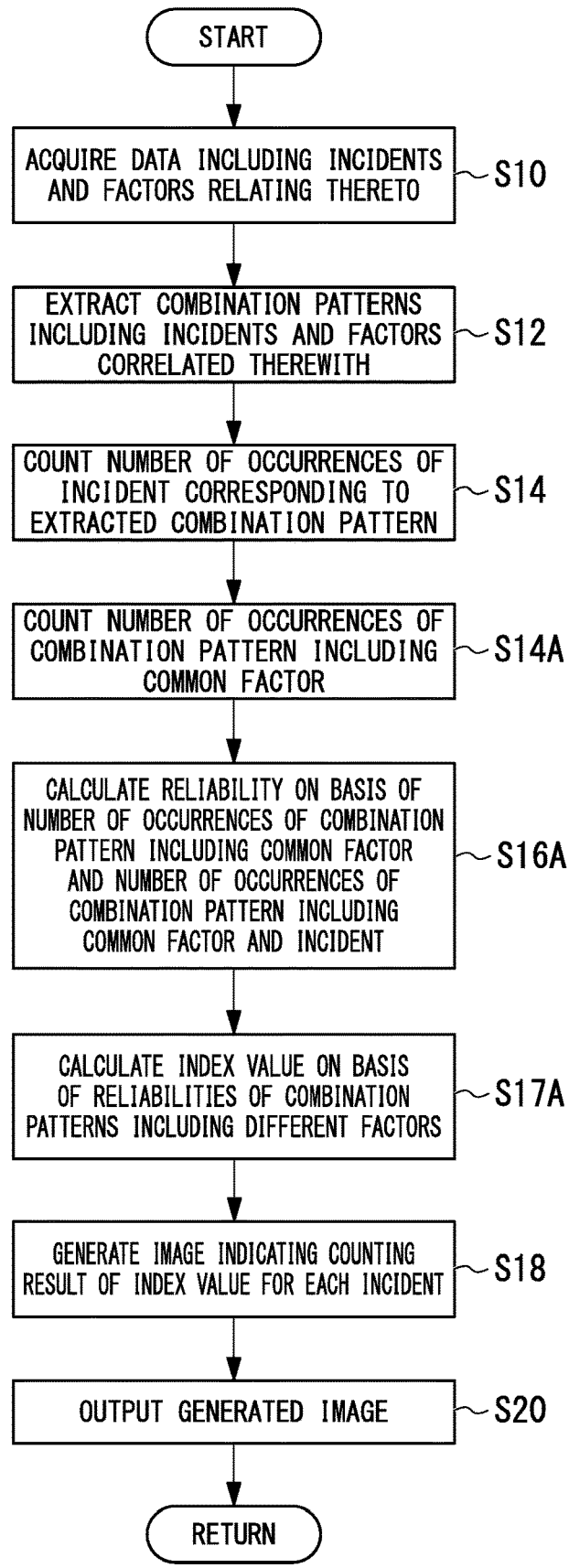
FIG. 13 is a flowchart showing an example of processing of the causal analysis device 1 according to a second embodiment.

The index value calculator 116 in the second embodiment performs the processing shown in FIG. 13 instead of the processing shown in FIG. 8. FIG. 13 is a flowchart showing an example of processing performed by the causal analysis device 1 according to the second embodiment. Differences from the processing shown in FIG. 8 will be mainly described below. After finishing the processing of S14, the counter 114 counts the number of occurrences of combination data including a common factor x in association with the common factor x on the basis of the extraction data 241 extracted in S12 (S14A). Thereafter, the counter 114 attaches the combination ID to the counted number of occurrences and writes the resulting data to the count data storage unit 240 as count data 242.

Next, the counter 114 calculates the reliability of each combination data item including the common factor and incident on the basis of the number of occurrences of the combination data item including the common factor calculated in S14A and the number of occurrences of the combination data item including the common factor and incident calculated in S14 (S16A). Thereafter, the counter 114 attaches the combination ID to the calculated reliability and writes the resulting data to the count data storage unit 240 as reliability data 243.

Next, the index value calculator 116 calculates an index value on the basis of the reliabilities of a plurality of combination data items including different factors (S17A).

Figure 14:
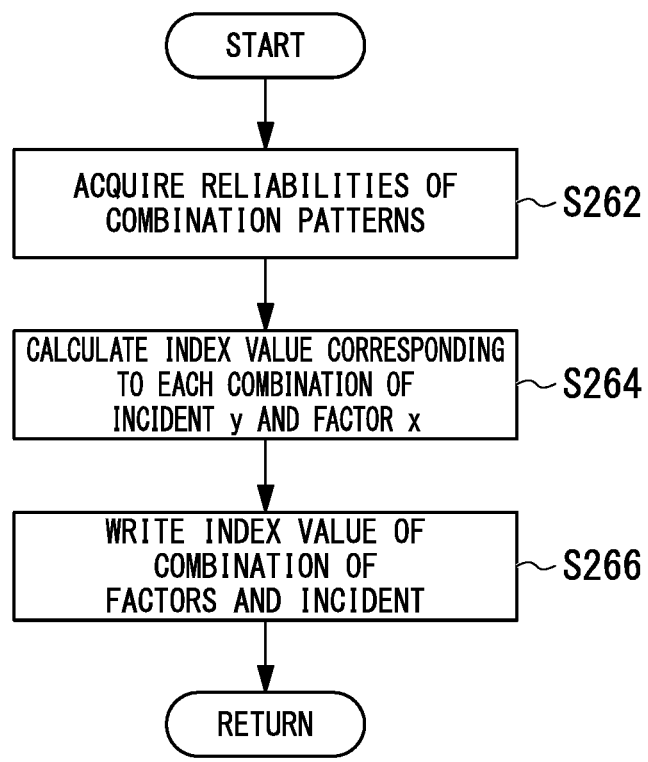
FIG. 14 is a flowchart showing an example of a process (S17A) of calculating an index value in the embodiment.

FIG. 14 is a flowchart showing an example of an index value calculation process in the embodiment. First, the index value calculator 116 acquires the reliability of a combination of incident y and factor x of each combination data item from the reliability data 243 using the combination ID as a key (S262). Next, the index value calculator 116 calculates an index value corresponding to each combination of incident y and factor x from the reliability obtained in S262 using whether or not there is combination data item including a common factor and incident among a plurality of combination data items as a calculation condition (S264). Next, the index value calculator 116 writes the index value calculated in S264 to the index value storage unit 250 (S266).

For example, the index value calculator 116 determines the highest of the reliabilities of combination data items, each including a common incident and at least one different factor, as an index value. It is to be noted that the highest is an example and the present invention is not limited thereto.

Next, the causal analysis device 1 performs the processing of S18 and onward and generates image data based on the index values described above.

Figure 15:
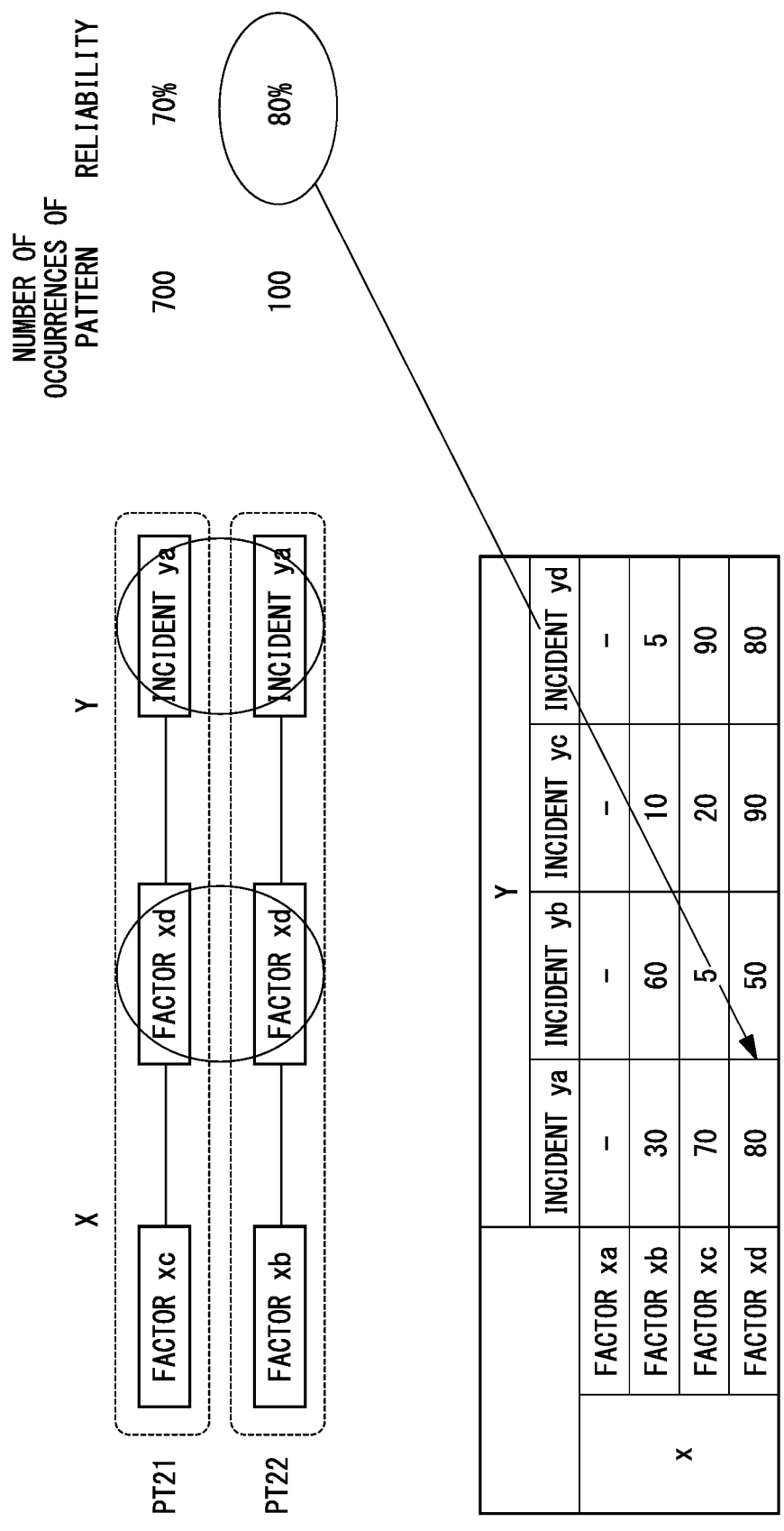
FIG. 15 is a diagram showing a result of processing performed on combination data extracted as certain extraction data 241.

FIG. 15 is a diagram showing a result of processing performed on combination data extracted as certain extraction data 241. In the example of FIG. 15, the extraction data 241 includes combination data PT21 and combination data PT22. The combination data PT21 is a pattern in which both a factor xc and a factor xd have individually occurred and an incident ya has occurred as a result. The combination data PT22 is a pattern in which both a factor xb and the factor xd have individually occurred and the incident ya has occurred as a result.

In the example of FIG. 15, it is shown that the counter 114 counts the number of occurrences n(PT21) of the combination data PT21, the counting result is 700, and the reliability is 70%. It is also shown that the number of occurrences n(PT22) of the combination data PT22 is 100 and the reliability is 80%.

As described above, the counter 114 counts (or calculates) the number of occurrences of the pattern of each combination data item and the reliability thereof. It is to be noted that FIG. 15 shows an example and the present invention is not limited to the example.

The index value calculator 116 of the present embodiment calculates an index value of each combination of factor xi and incident yj on the basis of the reliability of each combination data item. This will be described below.

In the combination data PT21 and the combination data PT22, the incident Ya and the factor xd are common and at least the factor xb and the factor xc are different. In the example of FIG. 15, the combination data PT21 and the combination data PT22 have the common incident Ya and the single common factor xd, and have at least one different factor. In this case, the index value calculator 116 selects the highest of the reliability of the combination data PT21 and the reliability of the combination data PT22 as an estimated value of the reliability corresponding to the incident common to the two combination data items and determines the selected estimated value as an index value corresponding to the incident Ya and the factor xd. In the case shown in FIG. 15, the reliability of 80% of the combination data PT22 is the highest and the index value calculator 116 selects the highest value.

As described above, the index value calculator 116 of the present embodiment calculates an index value of each combination of factor x and incident y on the basis of the reliability of each combination data item. On the basis of the reliability data 243 which is the counting result of the counter 114, the index value calculator 116 calculates an index value from the reliability that corresponds to the combination of incident y and factor x and changes in accordance with the number of occurrences of the combination of incident y and factor x.

The index value calculator 116 generates a cross table on the basis of the index value of each combination of factor x and incident y. Then, the causal analysis device 1 of the present embodiment displays a heat map or the like, similar to the case of the first embodiment described above.

According to the second embodiment described above, the index value calculator 116 uses the combination data to calculate the reliability on the basis of both the total number of combination data items, each including a combination of common factors, and the number of combination data items, each including a combination of factors and including a common incident, thereby allowing the causal analysis device 1 to generate image data on the basis of the reliability.

According to the second embodiment, it is possible to generate an image from which it is possible to easily identify the reliability of combination data extracted from collection data, while achieving the same advantages as those of the first embodiment described above.

A causal analysis method using the highest of the reliabilities corresponding to an incident common to a plurality of combination data items as an estimated value of the reliability corresponding to the incident is exemplified in the above description, but alternatively the average, the sum, or the like of the reliabilities corresponding to the incident may also be used.

Third Embodiment

A third embodiment will now be described. The third embodiment is different from the first embodiment in the method of the index value calculator 116 calculating index values. This difference will be mainly described below.

Index values of the present embodiment are calculated as follows.

Figure 16:
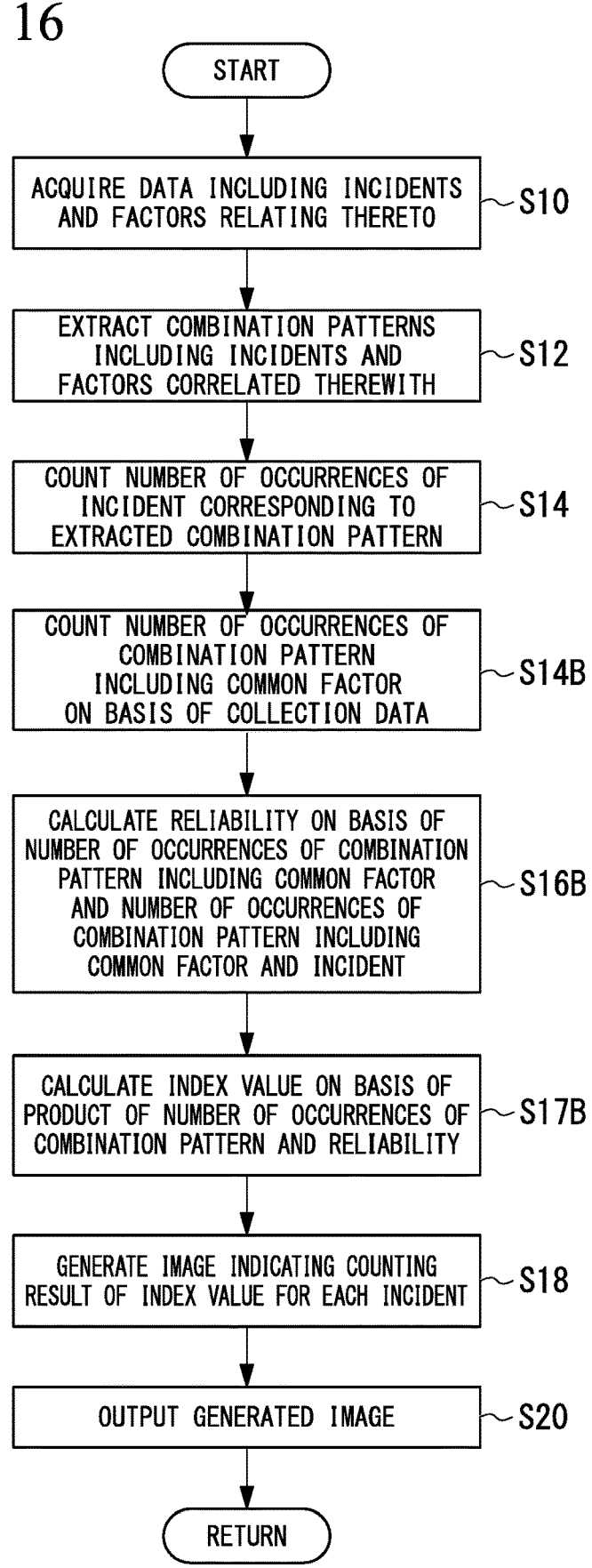
FIG. 16 is a flowchart showing an example of processing of the causal analysis device 1 according to a third embodiment.

The causal analysis device 1 in the third embodiment performs the processing shown in FIG. 16 instead of the processing shown in FIG. 8. FIG. 16 is a flowchart showing an example of processing of the causal analysis device 1 of the embodiment. Differences from the processing shown in FIG. 8 will be mainly described below. After finishing the processing of S14, the counter 114 counts the number of occurrences of combination data including a common factor x in association with the common factor x on the basis of the extraction data 241 extracted in S12 (S14B). Thereafter, the counter 114 attaches the combination ID to the counted number of occurrences and writes the resulting data to the count data storage unit 240 as count data 242.

Next, the counter 114 calculates the reliability of each combination data item including the common factor x and incident y on the basis of the number of occurrences of the combination data item including the common factor x calculated in S14B and the number of occurrences of the combination data item including the common factor x and incident y calculated in S14 (S16B). Thereafter, the counter 114 attaches the combination ID to the calculated reliability and writes the resulting data to the count data storage unit 240 as reliability data 243.

Next, the index value calculator 116 calculates an index value that changes in accordance with the number of occurrences of the combination of the incident y and the factor x on the basis of the product of the number of occurrences of combination data calculated in S14 and the reliability calculated in S16B (S17B). For example, for each combination data item, the index value calculator 116 calculates the product of the number of occurrences of the combination data item calculated in S14 corresponding to the combination ID and the reliability calculated in S16B corresponding to the same combination ID. When data including a common incident y and factor x is present in target combination data items to which different combination IDs are attached, the index value calculator 116 sums the products of the combination data items and sets the sum as the index value. When data including a common incident y and factor x is not present in target combination data items to which different combination IDs are attached, the index value calculator 116 sets the products of the combination data items as the index value. As described above, the index value calculator 116 sets a value based on the product of each combination data item as the index value.

The causal analysis device 1 generates image data based on the index values calculated as described above.

Figure 17:
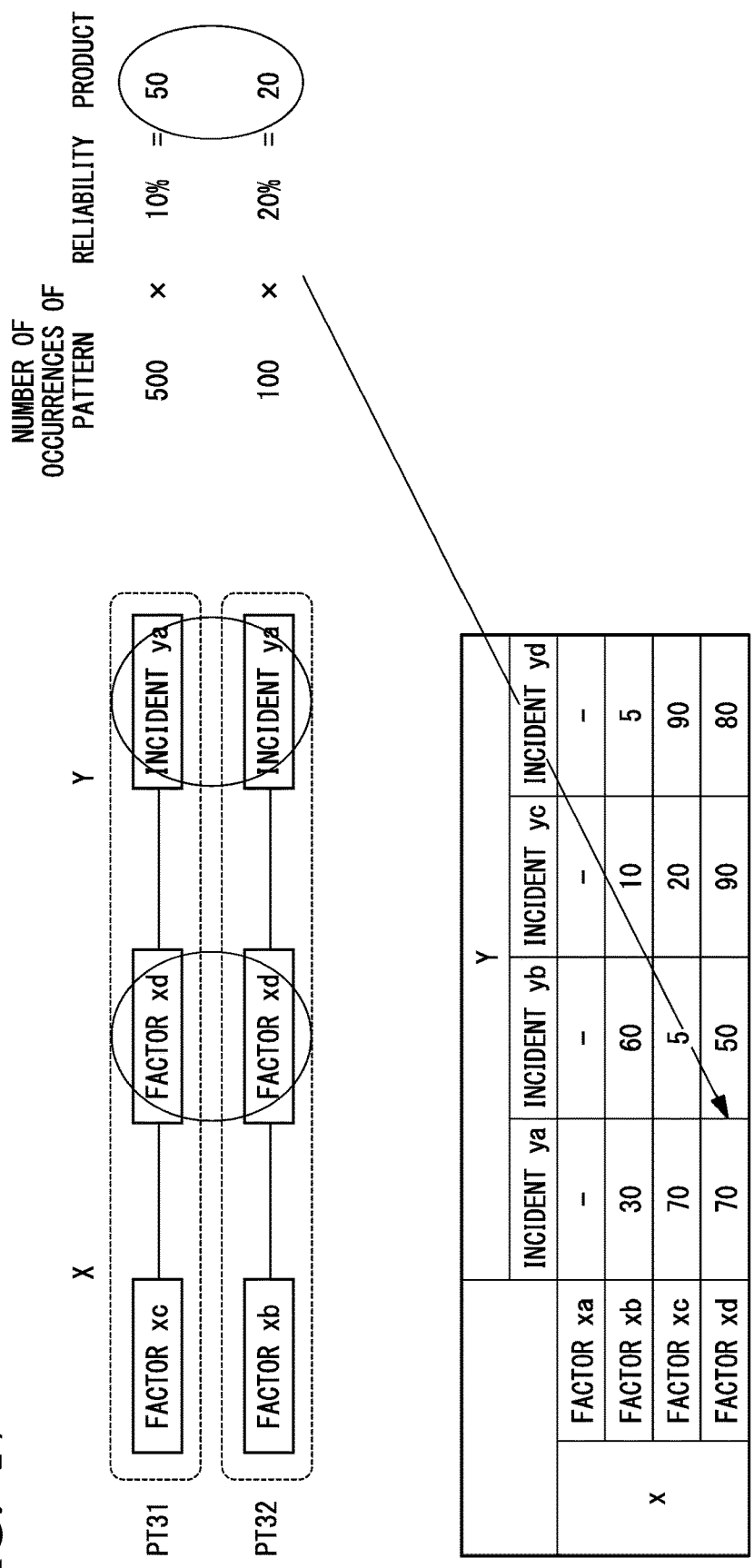
FIG. 17 is a diagram showing a result of processing performed on combination data extracted as certain extraction data 241.

FIG. 17 is a diagram showing a result of processing performed on combination data extracted as certain extraction data 241. The example of FIG. 17 shows the case in which the extraction data 241 includes combination data PT31 and combination data PT32. The combination data PT31 is a pattern in which both a factor xc and a factor xd have individually occurred and an incident ya has occurred as a result. The combination data PT32 is a pattern in which both a factor xb and the factor xd have individually occurred and the incident ya has occurred as a result. In the example of FIG. 17, it is shown that the counter 114 counts the number of occurrences n(PT31) of the combination data PT31 and the counting result is 500.

Here, note that the reliability indicating the number of occurrences n(PT31) of the combination data PT31 as a ratio for the case in which both the factor xc and the factor xd have occurred is 10%. The index value calculator 116 multiplies the number of occurrences 500 of the combination data by the reliability 10% to obtain the product (50). In the example of FIG. 17, it is also shown that the number of occurrences n(PT32) of the combination data PT32 is 100. When the data reliability of the combination data PT32 is calculated in the same manner as that of the combination data PT31, the calculated data reliability of the combination data PT32 is 20%. The index value calculator 116 multiplies the number of occurrences 100 of the combination data by the reliability 20% to obtain the product (20).

As described above, the counter 114 counts (or calculates) the number of occurrences of each combination data item and the reliability thereof.

Next, description will focus on the counting result of the number of occurrences of the pattern of each combination data item and the reliability thereof. The incident Ya and the factor xd are common in the combination data PT31 and the combination data PT32. In this case, the index value calculator 116 sums the products of the two combination data items and sets the sum as the index value. In short, the index value calculator 116 sets the sum 70 of the product 50 of the combination data PT31 and the product 20 of the combination data PT32 as the index value.

As described above, the index value calculator 116 of the present embodiment calculates a value based on the product of the reliability and the number of occurrences of combination data calculated for each combination data item as an index value of the combination of factor x and incident y. The index value calculator 116 generates a cross table on the basis of the index value of each combination of factor x and incident y. The value in an entry corresponding to the incident Ya and factor xd in the cross table is as described above and the index value calculator 116 determines the values of the other entries in the same manner.

As described above, the causal analysis device 1 of the present embodiment displays a heat map or the like, similar to the case of the first embodiment described above.

According to the third embodiment described above, the index value calculator 116 calculates a value based on the product of the reliability that changes in accordance with the number of occurrences of the combination of incident y and factor x and the number of occurrences of combination data including the common incident y as an index value of the combination of the incident y and the factor x. This allows the causal analysis device 1 to generate image data based on the reliability and the number of occurrences of combination data in the extraction data.

According to the third embodiment, it is possible to generate an image from which it is possible to easily analyze the cause of the incident y on the basis of the reliability and the number of occurrences of combination data in the extraction data, while achieving the same advantages as those of the first embodiment described above.

The causal analysis device 1 of the third embodiment may perform the above calculation as shown in equation (2).

(The number of occurrences of combination data of factor $x$ and incident $y$)×(reliability)=(the number of occurrences of combination data of factor $x$ and incident $y$)$^2$/(the number of occurrences of a pattern including combination of factors $x$) (2)

According to the above equation (2), by having a term including the square (a power) of the number of occurrences of combination data of factor x and incident y in the numerator, it is possible to set the index value to a higher value as the number of occurrences increases, as compared to when the number of occurrences is handled linearly. The calculation shown in the above equation (2) is exemplified by a calculation of the square, but may also include a calculation of a higher power.

The causal analysis device 1 exemplified in the first to third embodiments described above may remove a part of the collection data from the analysis target to perform a desired analysis process for the purpose of reducing processing load or the like. For example, the functional units of the controller 100 may perform processing through at least one of the following methods.

(1) Method of narrowing down a pattern of an incident using generated combination data on the basis of a prediction model that predicts the tendency of generation of combination data on the basis of learning data.

By assuming that an incident that will occur in the future relates to the same cause as that of the incident that has occurred in the past, it is possible to define the relationship between the incident and the cause as a model (a prediction model). By extracting desired combination data using the prediction model through the pattern extractor 112, the causal analysis device 1 can narrow down the number of combination data items to analyze the cause.

(2) Method of deleting a specific incident that has occurred a relatively great number of times from the analysis target.

If the number of occurrences of an incident which is not to be analyzed is greater than the number of occurrences of an incident which is to be analyzed, it may be difficult to analyze the cause. In this case, the pattern extractor 112 deletes a specific incident that has occurred a relatively great number of times from the analysis target. For example, a determination threshold for determining whether or not an incident is the analysis target is set to a value greater than the number of occurrences of an incident that is set as the analysis target. The extraction condition storage unit 220 writes the determination threshold as an extraction condition for performing the extraction process described above.

(3) Method of deleting combination data having a relatively low occurrence rate (reliability) from the analysis target.

Even when combination data is detected, the number of occurrences of an incident may sometimes be relatively small compared to the number of occurrences of a combination of factors. The occurrence rate of combination data is referred to as reliability in the following description. In such a case, the pattern extractor 112 deletes combination data having a low reliability from the analysis target. The method of calculating the reliability will be described later.

(4) Method of deleting a factor whose number of occurrences is significantly greater than the number of occurrences of an incident from the analysis target when analyzing the incident whose number of occurrences is significantly smaller than the number of occurrences of the factor.

When an incident whose number of occurrences is significantly smaller than the number of occurrences of a factor is to be analyzed, it may sometimes be presumed that the factor is not a cause of the incident. In this case, the pattern extractor 112 deletes combinations of the incident whose number of occurrences is significantly smaller than the number of occurrences of the factor from the analysis target.

(5) Method of deleting combination data in which the time difference between the time at which a factor has occurred and the time at which an incident has occurred is equal to or greater than a predetermined value.

When it is possible to determine that the time at which a factor that can be a cause has occurred is within a range not relating to the incident, the pattern extractor 112 deletes corresponding combination data from the analysis target.

In the first to third embodiments, the causal analysis device 1 may not perform pattern extraction. That is, although the first to third embodiments have been exemplified by examples in which the reliability and the index value are calculated on the basis of the number of occurrences of combination data extracted by the pattern extractor 112, at least one of the reliability and the index value may be calculated on the basis of the number of occurrences of combination data included in the collection data.

Fourth Embodiment

A fourth embodiment will now be described. A description will be given of the case in which the causal analysis device 1A generates extraction condition information in the fourth embodiment. For example, the case in which the causal analysis device 1 acquires the extraction condition information is shown in the first to third embodiments. On the other hand, the causal analysis device 1A of the fourth embodiment analyzes the correlation between incidents and factors on the basis of collection data acquired in the past, generates extraction condition information with the analysis result as an extraction condition, and performs a causal analysis process on the basis of the generated extraction condition information. This point will be mainly described below.

Figure 18:
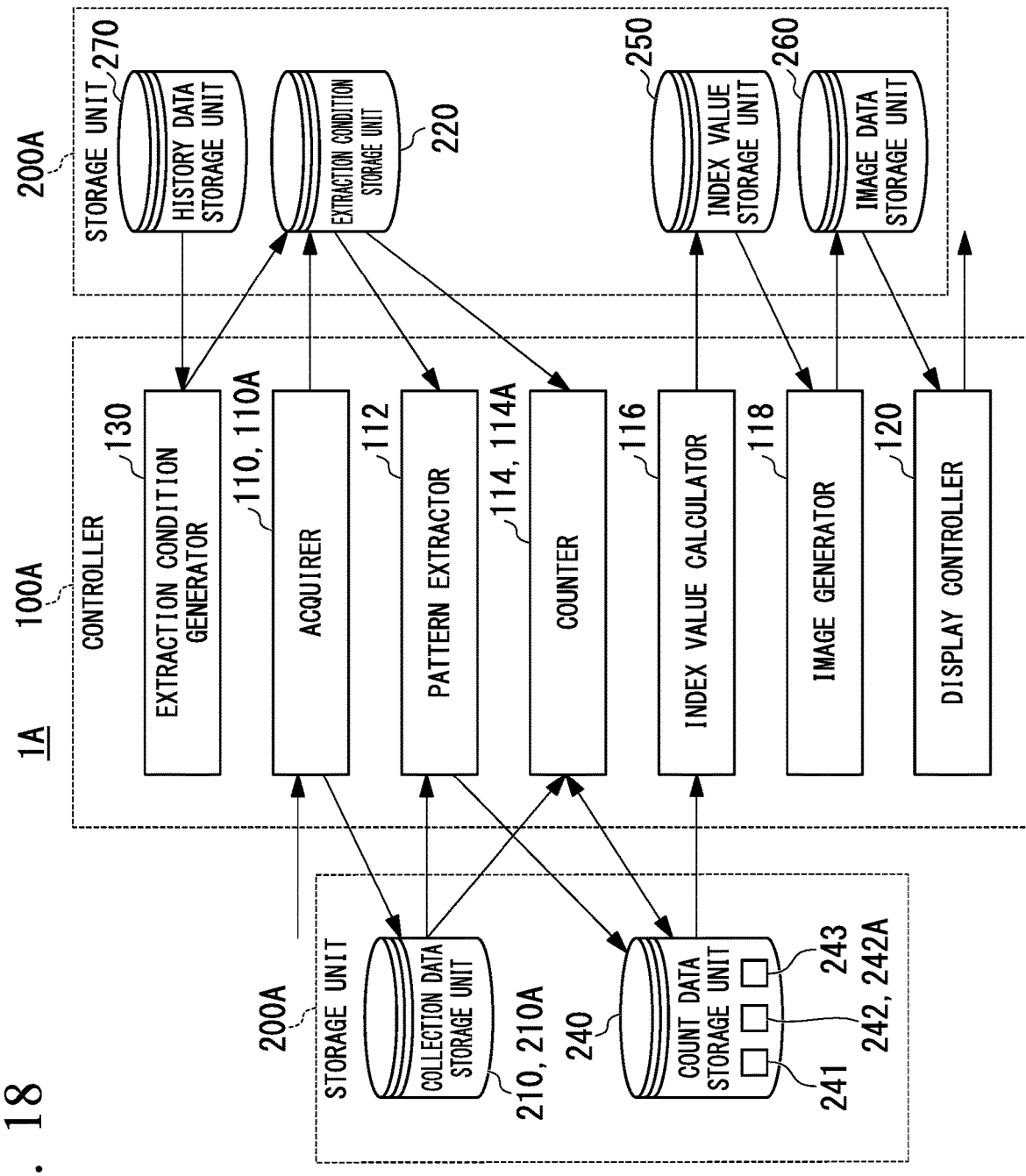
FIG. 18 is a diagram showing an example of the configuration of a part of a causal analysis device 1A according to a fourth embodiment.

FIG. 18 is a diagram showing an example of the configuration of a part of a causal analysis device 1A according to the embodiment. The causal analysis device 1A includes a controller 100A and a storage unit 200A. Differences from the causal analysis device 1 described above will be mainly described.

The storage unit 200A includes a collection data storage unit 210, an extraction condition storage unit 220, a count data storage unit 240, an index value storage unit 250, an image data storage unit 260, and a history data storage unit 270.

The history data storage unit 270 has the same configuration as the count data storage unit 240, and count data which is a result of causal analysis performed in the past is written to history data storage unit 270.

The controller 100A includes an acquirer 110, a pattern extractor 112, a counter 114, an index value calculator 116, an image generator 118, a display controller 120, and an extraction condition generator 130.

The extraction condition generator 130 generates extraction condition information based on a result of causal analysis performed in the past and stores the generated extraction condition information in the extraction condition storage unit 220. The extraction condition generator 130 may generate extraction condition information including combination data in which it is determined that there is a correlation between an incident y and a factor y as a result of causal analysis performed in the past but the present invention is not limited thereto.

The extraction condition generator 130 controls execution of a learning mode for generating extraction condition information and a causal analysis mode for analyzing the cause of an incident using the generated extraction condition information. Details of the learning mode and the causal analysis mode will be described later.

Figure 19:
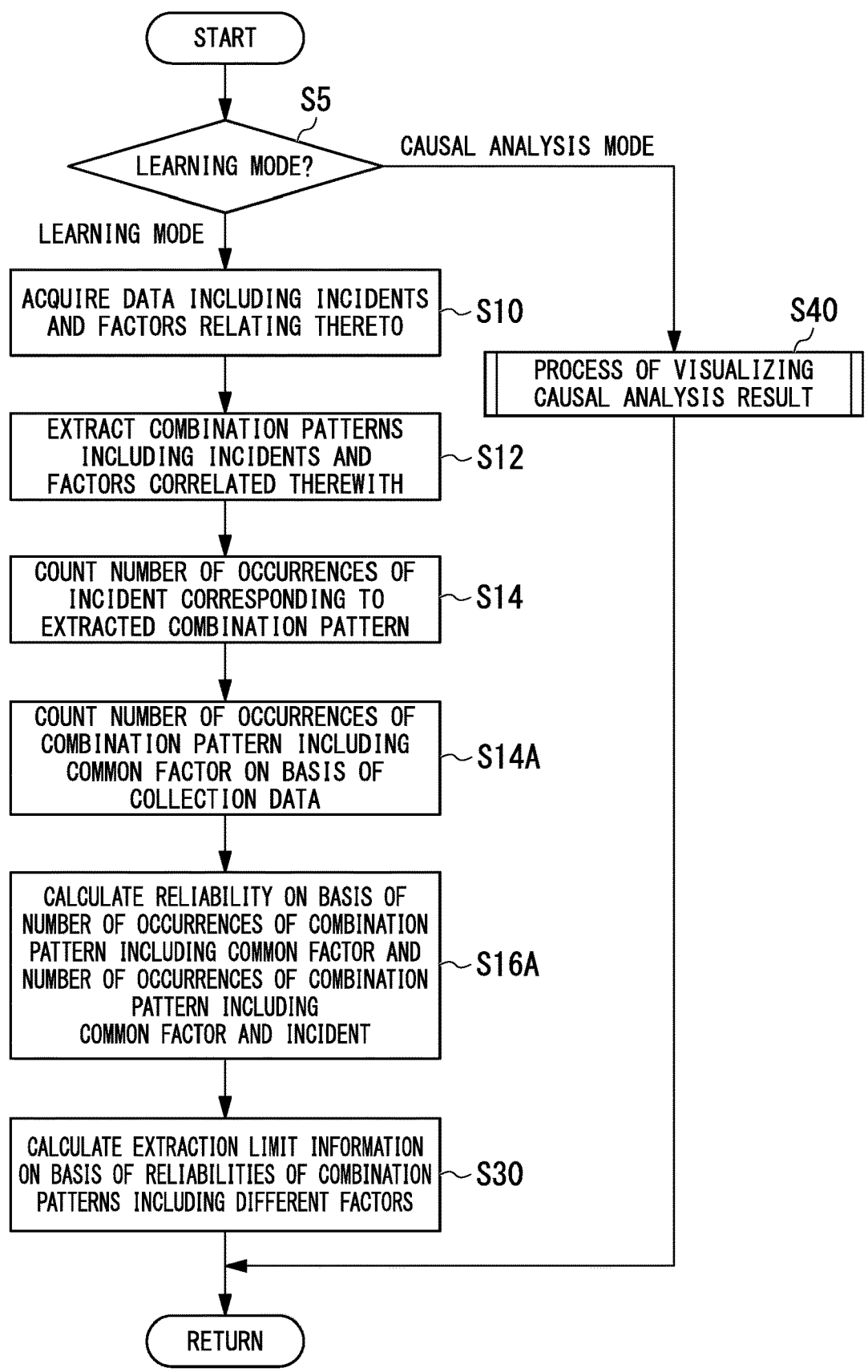
FIG. 19 is a flowchart showing an example of processing of the causal analysis device 1A according to the embodiment.

FIG. 19 is a flowchart showing an example of processing of the causal analysis device 1A according to the embodiment.

First, the extraction condition generator 130 determines an operating mode (S5). Upon determining that the operating mode is the learning mode, the extraction condition generator 130 performs the processes of S10 to S30 for generating extraction condition information as processes of analyzing the correlation between the factor x and the incident y. In each of the processes of S10 to S16A, the causal analysis device 1A performs the same process as that of the causal analysis device 1A of the second embodiment described above.

Next, the extraction condition generator 130 transfers each data item in the count data storage unit 240 to the history data storage unit 270. The extraction condition generator 130 selects combination data having the highest reliability on the basis of data stored in the history data storage unit 270 as data corresponding to the reliability data 243. The extraction condition generator 130 writes the selected combination data as extraction condition information to the extraction condition storage unit 220 (S30).

In the above description, the extraction condition generator 130 selects the combination data having the highest reliability. However, alternatively, one or a plurality of combination data items may be selected. For example, when a plurality of combination data items are extracted, data items whose reliabilities are higher than a predetermined value such as an average of reliabilities corresponding to the incident may be extracted and a predetermined number of data items which are selected in descending order of reliability may be extracted.

On the other hand, upon determining in S5 that the operating mode is the causal analysis mode, the extraction condition generator 130 performs a causal analysis process based on new collection data and causes the analysis result to be visualized (S40).

An example of the processing of the causal analysis mode performed as S40 will be described below. In the case of the following example, the data collection device 2 forms combination data including information indicating a combination of the factor x described above as new collection data for the processing of the causal analysis mode. The data collection device 2 provides the combination data to the causal analysis device 1A.

A configuration of the causal analysis device 1A for performing the processing of the causal analysis mode will now be described with reference to FIG. 18. The storage unit 200A further includes a collection data storage unit 210A and count data 242A. The controller 100A further includes an acquirer 110A and a counter 114A. Differences between the controller 100 described above and the controller 100A and differences between the storage unit 200 described above and the storage unit 200A will be mainly described below.

The acquirer 110A acquires combination data including information indicating a combination of the factor x from the data collection device 2 as acquired data and writes the acquired data to the collection data storage unit 210A.

FIG. 20 is a diagram showing an example of collection data stored in the collection data storage unit 210A. The collection data is information in which information indicating a combination of factors is associated with a set ID identifying the information.

The counter 114A reads the collection data stored in the collection data storage unit 210A, performs a counting process for each combination data item stored as extraction condition information in the extraction condition storage unit 220, and writes the result as count data 242 to the count data storage unit 240A. For each combination data item in the extraction condition information in the collection data stored in the collection data storage unit 210A, the counter 114A obtains a result of counting the number of data items, each including all factors included in the combination data item, through the above counting, without considering the incident y.

FIG. 21 is a diagram showing an example of the count data 242A. The count data 242A is information in which information indicating the number of occurrences of a combination of factors is associated with a combination ID identifying the type of the combination. A result of counting that the counter 114A has performed on the combination data included in the collection data stored in the collection data storage unit 210 is written as the number of occurrences of the combination of factors.

Figure 22:
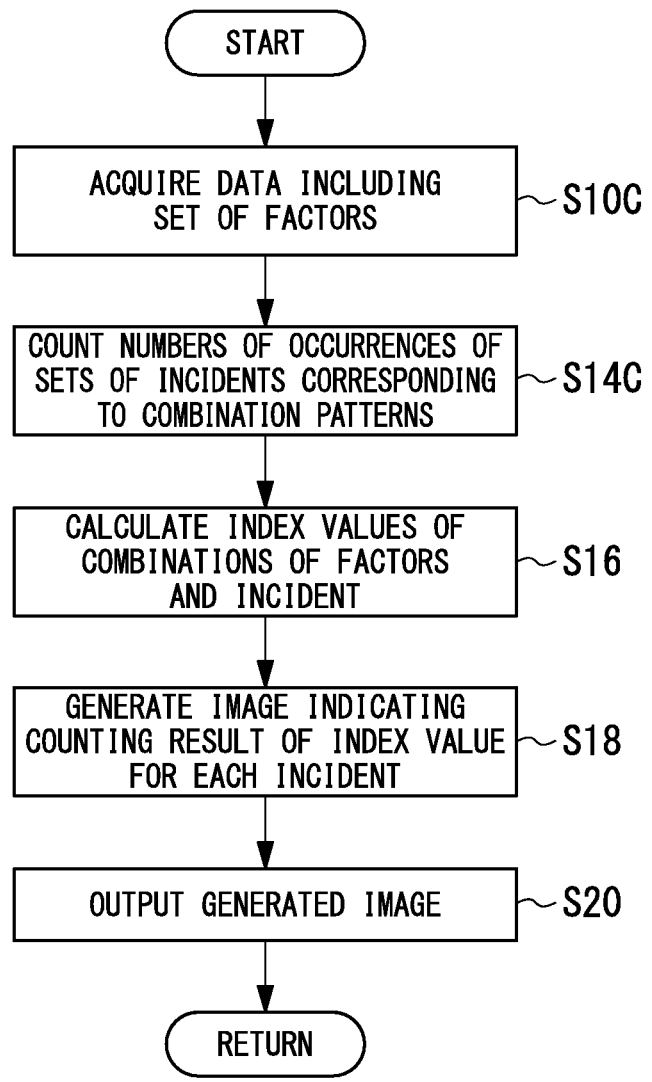
FIG. 22 is a flowchart showing an example of processing of a causal analysis mode performed by the causal analysis device 1A according to the embodiment.

FIG. 22 is a flowchart showing an example of processing of the causal analysis mode performed by the causal analysis device 1A in the embodiment. Differences from FIG. 8 will be mainly described. First, the acquirer 110 acquires the collection data via the communication interface 10 (S10C). Thereafter, the acquirer 110 writes the acquired collection data to the collection data storage unit 210.

Next, the counter 114A counts the number of occurrences of a combination of factors x corresponding to combination data on the basis of the acquired data collected by the acquirer 110 in S10 (S14C). The counter 114A writes the counting result to the count data storage unit 240 as the count data 242 in association with combination IDs.

Next, the index value calculator 116 refers to the count data 242 stored in the count data storage unit 240 using the combination IDs and calculates index values of combinations of incidents y and factors x (S16). Thereafter, the index value calculator 116 writes the calculated index values to the index value storage unit 250. For example, the index value calculator 116 counts the number of occurrences of each pattern as in the above examples shown in FIG. 9 and FIG. 10 or the like. Next, the image generator 118 generates image data on the basis of index values stored in the index value storage unit 250 (S18) and provides the generated image data (S20).

According to the causal analysis device 1A of the above embodiment, extraction is performed from combination data in which an incident and one or a plurality of factors causing the incident are associated with each other in accordance with occurrence of the combination data and an extraction condition is generated. The causal analysis device 1A counts the number of occurrences of each combination of factors on the basis of combinations of an incident and factors included in the combination data. On the basis of the counting result, the causal analysis device 1A calculates an index value that corresponds to a combination of an incident and a factor and changes in accordance with the number of occurrences of the combination of the incident and the factor. This makes it possible to more precisely analyze the cause of an incident which is caused by a plurality of factors in combination.

According to the causal analysis device 1A of the above embodiment, the extraction condition generator 130 can generate extraction condition information from a result of causal analysis of collection data acquired in the past such that specific combination data in which it is determined that there is a correlation between an incident y and a factor x is included in combination data to be extracted. By performing the extraction process on the basis of such extraction condition information, the causal analysis device 1A does not leak out a combination of factors included in combination data detected in the past from the extraction condition. This allows the causal analysis device 1A to increase the efficiency and reliability of the extraction process.

It is to be noted that a plurality of combination data items may be included in the extraction condition information generated by the extraction condition generator 130. The extraction condition generator 130 may set the priority of combination data such that a desired combination data item is preferentially selected from a plurality of combination data items.

According to the fourth embodiment described above, the extraction condition generator 130 generates the extraction condition information, thereby allowing the causal analysis device 1A to perform a process of extracting combination data based on combination data extracted from collection data of the past.

According to the fourth embodiment, while achieving the same advantages as those of the first embodiment described above, it is possible to use combination data extracted from collection data of the past in causal analysis of the combination data in collection data which has been newly collected such that the combination data extracted from the collection data of the past is not leaked out from that for the causal analysis. According to the fourth embodiment, it is also possible to generate an image from which it is possible to easily identify the reliability of combination data.

First Modification of Fourth Embodiment

A first modification of the fourth embodiment will now be described. In the first modification, processing including the processes of S10 to S20 in FIG. 8, 13, or 16 may be performed instead of the processes shown in FIG. 22, that is, instead of the processing of the causal analysis mode performed as S40, but the present invention is not limited thereto.

According to the first modification of the fourth embodiment, it is possible to take combination data of an incident and factors as a target of the processing of the causal analysis mode, while achieving the same advantages as those of the fourth embodiment described above.

Second Modification of Fourth Embodiment

A second modification of the fourth embodiment will now be described. In the above description of the process of S40, the data collection device 2 forms combination data indicating a set of factors x. On the other hand, in the second modification, data of each individual factor x may be provided to the causal analysis device 1A without forming data indicating a set of factors x. In this case, for example, the causal analysis device 1A (the acquirer 10C) may convert data acquired from the data collection device 2 into data indicating a set of factors x on the basis of combination data stored in the extraction condition storage unit 220. The causal analysis device 1A may also write the converted data to the collection data storage unit 210.

According to the second modification of the fourth embodiment, it is possible to perform causal analysis even on data of each individual factor x where the acquired data does not form a set of factors x, while achieving the same advantages as those of the fourth embodiment described above.

According to at least one of the embodiments described above, the causal analysis device includes the pattern extractor 112, the counter 114, the index value calculator 116, and the image generator 118. The pattern extractor 112 performs extraction from combination data in which an incident and one or a plurality of factors causing the incident are associated with each other in accordance with occurrence of the combination data. The counter 114 counts the number of occurrences of the incident or the number of occurrences of the combination of the plurality of factors on the basis of the combination of the incident and the factors included in the combination data. The index value calculator 116 calculates an index value that corresponds to the combination of the incident and the factors and changes in accordance with the number of occurrences of the combination of the incident and the factors on the basis of the counting result of the counter. The image generator 118 generates an image in which an image indicating the index value that the calculator has calculated for each combination of an incident and factors is associated with the combination of the incident and the factors. This makes it possible to more precisely analyze the cause of an incident which is caused by a plurality of factors in combination.

While some embodiments of the present invention have been described, these embodiments have been presented by way of example and are not intended to limit the scope of the invention. These embodiments can be implemented in various other forms, and various omissions, substitutions, and changes can be made without departing from the gist of the invention. These embodiments and modifications thereof are included in the scope or gist of the invention, as well as in the scope of the invention described in the claims and their equivalents.

For example, the pattern extractor 112 may extract combination data on the basis of any of the number of specific data items indicating the occurrence amount of combination data, the reliability thereof, the occurrence frequency, the density ratio, and a ratio between the number of combination data items corresponding to a common incident y and the total number of combination data items, instead of the number of occurrences of combination data corresponding to a common incident y. Here, the ratio between the number of combination data items corresponding to a common incident y and the total number of combination data items is, for example, a ratio between the number of combination data items corresponding to a common incident among combination data items included in data that is to be extracted and the total number of combination data items included in the data.

When the occurrence situation of incident y differs depending on the order in which factors x are combined, the pattern extractor 112 may extract such combination data items as different combination data. This allows the causal analysis device 1 of the embodiment to separately analyze combination data items in which factors x are combined in different orders.

The pattern extractor 112 or the counter 114 may count the number of occurrences of an incident in combination data before the combination data is extracted. For example, the pattern extractor 112 or the counter 114 may use combination data included in the acquired data as the combination data before extraction. The pattern extractor 112 or the counter 114 counts the number of occurrences of the incident in the acquired data and uses the counted number of occurrences of the incident as the count data 242 in the count data storage unit 240. This makes it possible to acquire the occurrence situation of the incident in the combination data included in the data before extraction. Further, the causal analysis device 1 can visualize a result of analysis performed on the basis of the number of occurrences of the incident in the combination data before extraction.

It is to be noted that the pattern extractor 112 may apply data including a combination of a common factor x as specific data indicating the occurrence amount of combination data.

It is to be noted that the collection data set to be analyzed by the causal analysis device 1 of the embodiment may include information such as time series information including time information, position information indicating the position, or logical information indicating a logical relationship with other data according to the usage of the data to be analyzed.

Further, the causal analysis device 1 of the embodiment may be applied, for example, to causal analysis of resulting incidents in state management of a product in operation or progress analysis of product selection in Internet shopping, in addition to the causal analysis of incidents in the production line described above, or may perform a causal analysis process according to the application. These show examples of applications different from the embodiments, but the present invention is not limited thereto. For example, when performing causal analysis of a resulting incident in state management of a product in operation, the causal analysis device 1 may use an event that has occurred during operation of the product as a factor and use a result that has occurred in association with the event as an incident. Further, when analyzing user preferences or the like in Internet shopping or the like, the causal analysis device 1 may use products selected as candidates during product purchase as factors and use a finally selected product as an incident.

REFERENCE SIGNS LIST 1, 1A Causal analysis device
100, 100 Controller
110 Acquirer
112 Pattern extractor
114, 114A Counter
116 Index value calculator
118 Image generator
120 Display controller
130 Extraction condition generator
200, 200A Storage unit

The invention claimed is:

1. A causal analysis device comprising:
an extractor configured to extract combination data from data in which an incident and one or a plurality of factors causing the incident are associated with each other in accordance with occurrence of the incident;
a counter configured to count the number of occurrences of the incident or the number of occurrences of a combination of the plurality of factors on the basis of a combination of the incident and the factors included in the combination data;
a calculator configured to calculate an index value that corresponds to the combination of the incident and the factors and changes in accordance with the number of occurrences of the combination of the incident and the factors on the basis of a result of the counting of the counter; and
a generator configured to generate an image in which an image indicating the index value calculated by the calculator for each combination of the incident and the factors is associated with the combination of the incident and the factors.

2. The causal analysis device according to claim 1, wherein the calculator is configured to calculate the number of occurrences of the combination of the incident and the factors as an index value of the combination of the incident and the factors.

3. The causal analysis device according to claim 1, wherein the counter is configured to refer to the combination data and to calculate a reliability of a combination of a factor and a combination of an incident on the basis of the number of combination data items, each including a combination having the factor as a common factor, and the number of combination data items including the incident as a common incident among combination data items, each including the combination of the common factor, and the calculator is configured to calculate the index value on the basis of the calculated reliability.

4. The causal analysis device according to claim 1, wherein the counter is configured to calculate a reliability of a combination of a factor and a combination of an incident on the basis of the number of combination data items, each including a combination having the factor as a common factor, and the number of combination data items including the incident as a common incident among combination data items, each including the combination of the common factor, and the calculator is configured to calculate a value calculated on the basis of a plurality of the reliabilities calculated from the combination data in which at least the incident is common as an index value of a combination of the incident and the factor.

5. The causal analysis device according to claim 1, wherein the counter is configured to calculate a reliability of a combination of a factor and a combination of an incident on the basis of the number of combination data items, each including a combination having the factor as a common factor, and the number of combination data items including the incident as a common incident among combination data items, each including the combination of the common factor, and the calculator is configured to calculate a value based on the product of a reliability calculated on the basis of the number of combination data items including the common incident and the number of combination data items including the common incident as an index value of a combination of the incident and the factor.

6. The causal analysis device according to claim 1, wherein the calculator is configured to calculate an index value of a combination of an incident and a factor on the basis of both the number of combination data items, each including a combination having the factor as a common factor, and a power of the number of combination data items, each including the combination of the factor and including the incident as a common incident, on the basis of the combination data.

7. The causal analysis device according to claim 1, wherein the extractor is configured to extract the combination data on the basis of an occurrence amount of the combination data corresponding to a common incident.

8. The causal analysis device according to claim 1, wherein the extractor is configured to extract the combination data that is to be counted by the counter on the basis of a ratio between the number of combination data items corresponding to a common incident among combination data items included in the data to be extracted and the total number of the combination data items included in the data.

9. The causal analysis device according to claim 1, wherein the extractor is configured to extract combination data items in which factors are combined in different orders as different combination data.

10. The causal analysis device according to claim 1, wherein the counter is configured to count the number of occurrences of an incident in the combination data before the combination data is extracted or the number of occurrences of a combination of a plurality of factors in the combination data before the combination data is extracted.

11. The causal analysis device according to claim 1, wherein the calculator is configured to calculate an index value of the combination of the incident and the factors on the basis of a result of extraction of the extractor and a result of counting of the counter.

12. A causal analysis device comprising:

an acquirer configured to acquire data in which one or a plurality of factors causing an incident are associated with each other as combination data;

a counter configured to count the number of occurrences of the incident or the number of occurrences of a combination of the plurality of factors on the basis of a combination of the incident and the factors included in the combination data;

a calculator configured to calculate an index value that corresponds to a combination of the incident and the factors and changes in accordance with the number of occurrences of the combination of the incident and the factors on the basis of a result of counting of the counter; and a generator configured to generate an image in which an image indicating the index value calculated by the calculator for each combination of the incident and the factors is associated with the combination of the incident and the factors.

13. A causal analysis method comprising:

extracting combination data from data in which an incident and one or a plurality of factors causing the incident are associated with each other in accordance with occurrence of combination data;

counting the number of occurrences of the incident or the number of occurrences of a combination of the plurality of factors on the basis of each combination of factors included in the combination data;

calculating an index value of a combination of the incident and the factors on the basis of a result of the counting; and generating an image in which an image indicating the index value calculated for each combination of the incident and the factors is associated with the combination of the incident and the factors.

14. A non-transitory computer readable storage medium storing one or more programs configured for execution by a computer, the one or more programs comprising instructions controlling the computer to:

extract combination data from data in which an incident and one or a plurality of factors causing the incident are associated with each other in accordance with occurrence of the combination data;

count the number of occurrences of the incident or the number of occurrences of a combination of the plurality of factors on the basis of each combination of factors included in the combination data;

calculate an index value of a combination of the incident and the factors on the basis of a result of the counting; and generate an image in which an image indicating the index value calculated for each combination of the incident and the factors is associated with the combination of the incident and the factors.

* * * * *